US006631322B1

(12) United States Patent
Arthur et al.

(10) Patent No.: US 6,631,322 B1
(45) Date of Patent: Oct. 7, 2003

(54) METHOD AND APPARATUS FOR VEHICLE MANAGEMENT

(75) Inventors: Richard Brownell Arthur, Ballston Spa, NY (US); William Edward Lorensen, Ballston Lake, NY (US); Michael Robert LaBlanc, Wilton, NY (US); Janet Arlie Barnett, Pattersonville, NY (US); Mark Mitchell Kornfein, Latham, NY (US); Douglas Roy Forman, Ballston Lake, NY (US); Paul Kenneth Houpt, Schenectady, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 10/065,989

(22) Filed: Dec. 6, 2002

(51) Int. Cl.[7] .......................... G01C 21/36; G06F 19/00

(52) U.S. Cl. ....................... 701/211; 701/204; 701/213; 701/117; 340/993; 340/995.19; 340/995.12; 340/991; 342/451; 342/457

(58) Field of Search ........................... 701/19, 20, 204, 701/205, 207, 208, 211, 213, 117, 119, 120, 121, 1; 340/988, 990, 995.1, 989, 993, 995.19, 995.12, 991; 342/450, 451, 457; 246/167 R, 5, 122 R, 182 R

(56) References Cited

U.S. PATENT DOCUMENTS

| | | | | | |
|---|---|---|---|---|---|
| 5,828,979 | A | * | 10/1998 | Polivka et al. | 701/117 |
| 6,179,252 | B1 | * | 1/2001 | Roop et al. | 246/293 |
| 6,184,802 | B1 | * | 2/2001 | Lamb | 340/994 |
| 6,236,933 | B1 | * | 5/2001 | Lang | 701/117 |
| 6,243,657 | B1 | * | 6/2001 | Tuck et al. | 702/150 |
| 6,401,034 | B1 | * | 6/2002 | Kaplan et al. | 701/209 |
| 6,484,094 | B1 | * | 11/2002 | Wako | 701/211 |
| 2002/0188400 | A1 | * | 12/2002 | Sato et al. | 701/212 |
| 2003/0006914 | A1 | * | 1/2003 | Todoriki et al. | 340/995 |
| 2003/0036848 | A1 | * | 2/2003 | Sheha et al. | 701/209 |
| 2003/0060973 | A1 | * | 3/2003 | Mathews et al. | 701/209 |
| 2003/0100326 | A1 | * | 5/2003 | Grube et al. | 455/515 |
| 2003/0105576 | A1 | * | 6/2003 | Kamiya et al. | 701/102 |

* cited by examiner

*Primary Examiner*—Thomas G. Black
*Assistant Examiner*—Ronnie Mancho
(74) *Attorney, Agent, or Firm*—Armstrong Teasdale LLP; Robert B. Reeser, III

(57) ABSTRACT

A method and system for pacing a vehicle along a path of travel is described. The method includes determining a geographical location of the vehicle, displaying a vehicle position icon representative of the geographical location, determining an optimal position for the vehicle, displaying a pace icon representative of the optimal position for the vehicle, and operating the vehicle to maintain a vehicle position icon displayed on the operator pace display substantially coincident with the pace icon displayed on the operator pace display. The system includes at least one on-board tracking system configured to determine a geographical location of the vehicle, at least one on-board computer configured to determine a display position of a pace icon, and at least one on-board operator pace display configured to display the pace icon at a position determined by the on-board computer, the operator pace display further configured to display the vehicle position, as determined by the on-board computer, relative to the pace icon.

29 Claims, 6 Drawing Sheets

METHOD AND APPARATUS FOR VEHICLE MANAGEMENT

BACKGROUND OF INVENTION

This invention relates generally to the operation of vehicles, and more specifically, to controlling the operation of railroad locomotives.

Modern freight trains can be over a mile long and can include many cars and locomotives. More specifically, such trains typically include more than one locomotive to provide the necessary pulling power and stopping tractive effort. The additional locomotives may be grouped at the head of the train or can appear at locations distributed along the length of the train that are remote from the lead locomotive. Locomotives are coordinated by cable-based communication when co-located at the head of the train or via radio-linked communications when the locomotives are distributed along the length of the train. Distributed configurations simplify slack handling among freight cars and air brake operations, facilitate reducing fuel consumption in large trains, and facilitate reducing inter-freight car forces around curves.

The manner in which train engineers drive a multi-locomotive plus freight train consist has a direct effect on the efficiency of fuel use and maintenance of safe train integrity. Engineers are trained extensively and tend to operate similar routes from day to day, but have limited information to help make decisions that impact performance during a trip. Based on their past experience with specific locomotives, track grade, weather conditions and the current freight load, drivers adjust throttle and brake settings to maintain speed below posted or dispatcher changed track limits, to arrive at the next destination (to pass a train or move into a siding to allow oncoming traffic passage) at a prescribed time, while simultaneously assuring dynamic slack action among freight cars is minimized.

The engineer and central dispatcher work collaboratively to keep the train on schedule, but each may lack crucial details of the other's environment which would benefit the railroad overall in terms of operations efficiency (throughput of trains) or fuel usage. For example, the train driver may know neither the fuel-efficiency/speed relationship for his train nor the actual slack in required arrival time at the next destination, and so travels at track speed limits using excess fuel. By displaying valid, current information about system and train performance attributes, the driver has an opportunity to make tradeoffs in speed vs. arrival time that minimize fuel use and arrive at the required schedule time.

SUMMARY OF INVENTION

In one aspect, a method for pacing a vehicle along a path of travel is described. The method includes determining a geographical location of the vehicle, displaying a vehicle position icon representative of the geographical location, determining an optimal position for the vehicle, displaying a pace icon representative of the optimal position for the vehicle, and operating the vehicle to maintain a vehicle position icon displayed on the operator pace display substantially coincident with the pace icon displayed on the operator pace display.

In another aspect, a system for pacing a vehicle along a path of travel is described. The system includes at least one on-board tracking system configured to determine a geographical location of the vehicle, at least one on-board computer configured to determine a display position of a pace icon, and at least one on-board operator pace display configured to display the pace icon at a position determined by the on-board computer, the operator pace display further configured to display the vehicle position, as determined by the on-board computer, relative to the pace icon.

In yet another aspect, a locomotive pacing system for pacing a locomotive along a path of travel is provided. The locomotive pacing system includes at least one tracking system configured to determine a geographical location of the locomotive, at least one on-board computer, including a memory and a non-volatile storage medium in communication with the at least one tracking system. The on-board computer is configured to determine a display position of a pace icon. The system also includes at least one operator pace display in communication with the at least one on-board computer wherein the operator pace display is configured to display the pace icon at a position determined by at least one of the on-board computer and a central computer, and the operator pace display further configured to display the locomotive position, as determined by at least one of the on-board computer and a central computer, relative to the pace icon. The pacing system includes a system for monitoring locomotive operation including sensors configured to determine at least one of locomotive speed, engine power, train slack, track curvature, track incline locomotive heading and heading rate wherein heading represents the direction of travel of the locomotive, reverser handle position, tracklines 8 and 9, online/isolate switch position, fuel remaining, and an interface coupled to the sensors and in communication with the on-board computer.

DETAILED DESCRIPTION

As used herein, the term "locomotive consist" means one or more locomotives physically connected together, with one locomotive designated as a lead locomotive and the other locomotives designated as trailing locomotives. A "train consist" means a combination of cars and at least one locomotive consist. Typically, a train consist is built in a terminal/yard and the locomotive consist is located at the head-end of the train. Occasionally, the locomotive consist may be distributed within the train consist or attached to the last car in the train consist. Additional locomotive consists within or at the end of trains sometimes are utilized to improve train handling and/or to improve train consist fuel efficiency performance by reducing train drag in curves, or added in route as assists for hills, for unanticipated loss of traction due to weather, track conditions or unplanned emergency stops on grade. A locomotive consist at a head-end of a train may or may not control locomotive consists within the train consist.

A locomotive consist is further defined by the order of the locomotives in the locomotive consist, i.e. lead locomotive, first trailing locomotive, second trailing locomotive, and the orientation of the locomotives with respect to short-hood forward versus long-hood forward. Short-hood forward refers to the orientation of the locomotive cab and the direction of travel. Most North American railroads typically orient the lead locomotive short-hood forward to facilitate forward visibility of the locomotive operating crew.

The lead locomotive controls the progress of the train along a route or path of travel. The lead locomotive controls trailing locomotives using a signaling plus automatic control system (not shown) that relays throttle and brake settings of the lead locomotive to each of the trailing locomotives. The automatic control system may select trailing locomotive throttle and brake settings to be the same as the lead locomotive, or may select throttle and brake settings that are different. The operator of the lead locomotive adjusts the throttle and brake settings of locomotives in the consist to achieve a speed which is consistent with allowable track speed limits and which will keep the train on schedule. Many factors determine the geographical location of where the train should be at any given time. Many of these factors are beyond the sensing capability of the train operator, such as, for example, location and speed of opposing traffic, location of sidings to pass or be passed by another train, needs for refueling and crew changes, locations and schedule of crews performing track maintenance.

Figure 1:
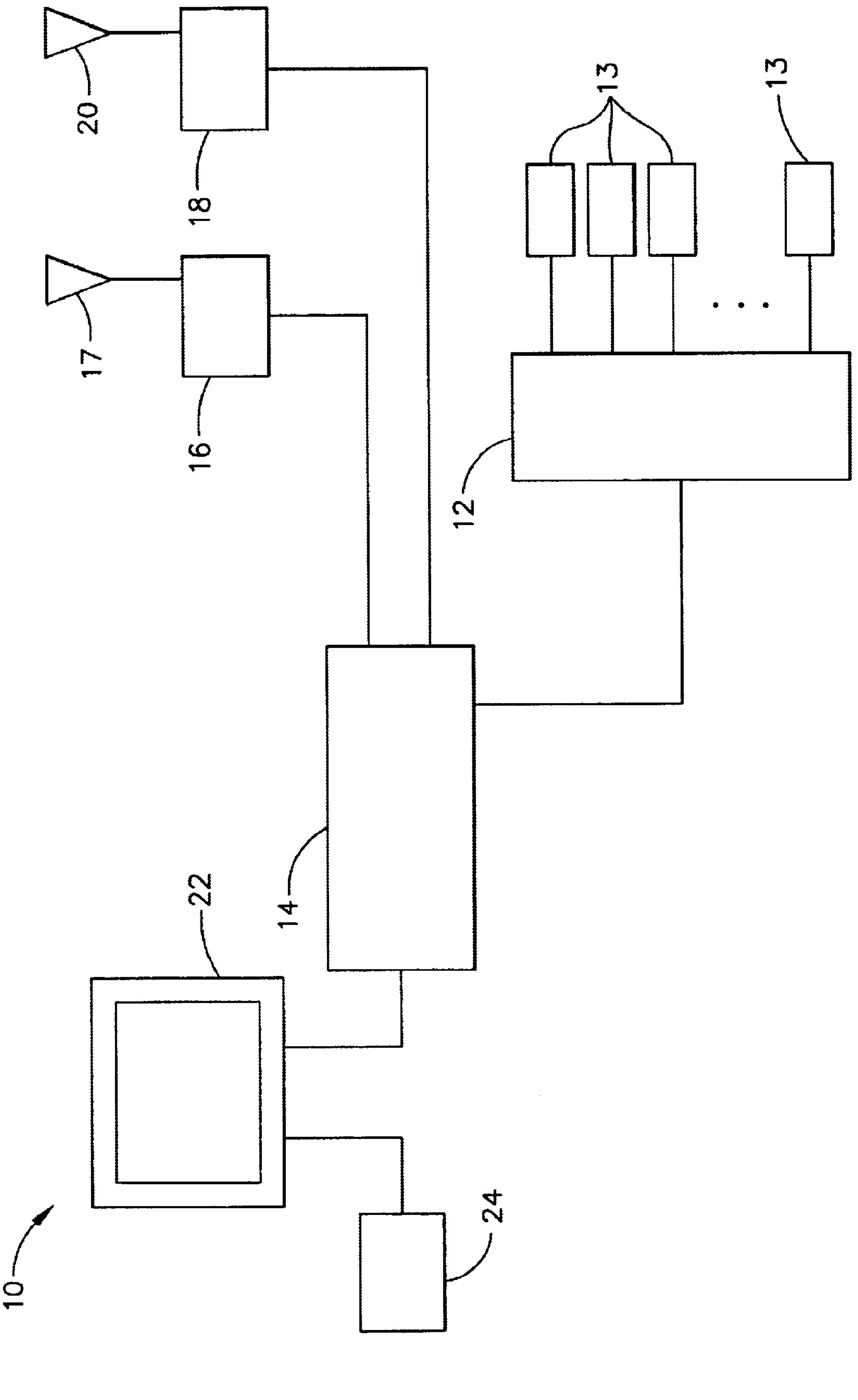
FIG. 1 is a block diagram of an on-board pacing system.

FIG. 1 is a block diagram of an on-board pacing system 10. Although the on-board system 10 is sometimes described herein in the context of a locomotive, it should be understood that pacing system 10 can be used in connection with cars, buses, ships, ferries, aircraft, animal and person-powered vehicles and other vehicles as well as any other train consist member. More specifically, the present invention may be utilized in the management of locomotives, trucks, barges submarines, spacecraft and people. Also, and as explained below, each locomotive in a train consist may not necessarily include pacing system 10.

In one more specific aspect of the present invention, pacing system 10 includes a vehicle interface 12 for interfacing with sensors located in other systems of the particular locomotive on which on-board system 10 is mounted, and an on-board computer 14 coupled to receive inputs from vehicle interface 12. Vehicle interface 12 is electrically coupled to a plurality of sensors 13. Pacing system 10 also includes a tracking system 16, which may include an antenna 17, a communications system 18, which may include an antenna 20. In an exemplary embodiment, tracking system 16 is a GPS receiver utilizing antenna 17. In other embodiments, tracking system 16 may be an automatic or manual system for ascertaining a geographical location of a vehicle. In the exemplary embodiment communications system 18 is a satellite communications system, and tracking system 16 and communications system 18 are coupled to on-board computer 14. In an alternative embodiment, a geographical position of the vehicle may be manually input into on-board computer 14. System 10 also includes a power supply (not shown) for supplying power to components of system 10. In the exemplary embodiment, a radome (not shown) is mounted on the roof of the locomotive and houses the satellite transmit/receive antennas coupled to communications system 18 and an active GPS antenna coupled to GPS receiver 16. In an alternative embodiment, communications system 18 is a radio receiver. In yet another embodiment, data may provided to or from an existing on-board microprocessor train control system and a plurality of associated sensors and data sources (not shown).

An operator pace display 22 is coupled to on-board computer 14 and mounted in a cab of locomotive 42 in a location convenient for the locomotive operator. In the exemplary embodiment, a keyboard 24 is coupled to operator pace display 22 to facilitate input of data from the operator. In an alternative embodiment, operator pace display 22 is a touch screen display such that data input from the operator is entered by touching a screen of operator pace display 22 in areas designated by a software program running on on-board computer 14. In another alternative embodiment, operator pace display may be located remotely from the vehicle being controlled, for example, a satellite or space vehicle may be controlled remotely from earth and the operator pace display would be located at an earth-based command center. In another embodiment, operator pace display 22 may project data output on a perimeter of a cab window of locomotive 42 to create a heads-up display. In still another embodiment, computer input device 24 includes a voice recognition input device and displays and warnings may be supplemented by synthesized voice warnings or other coded audible alarms.

Figure 2:
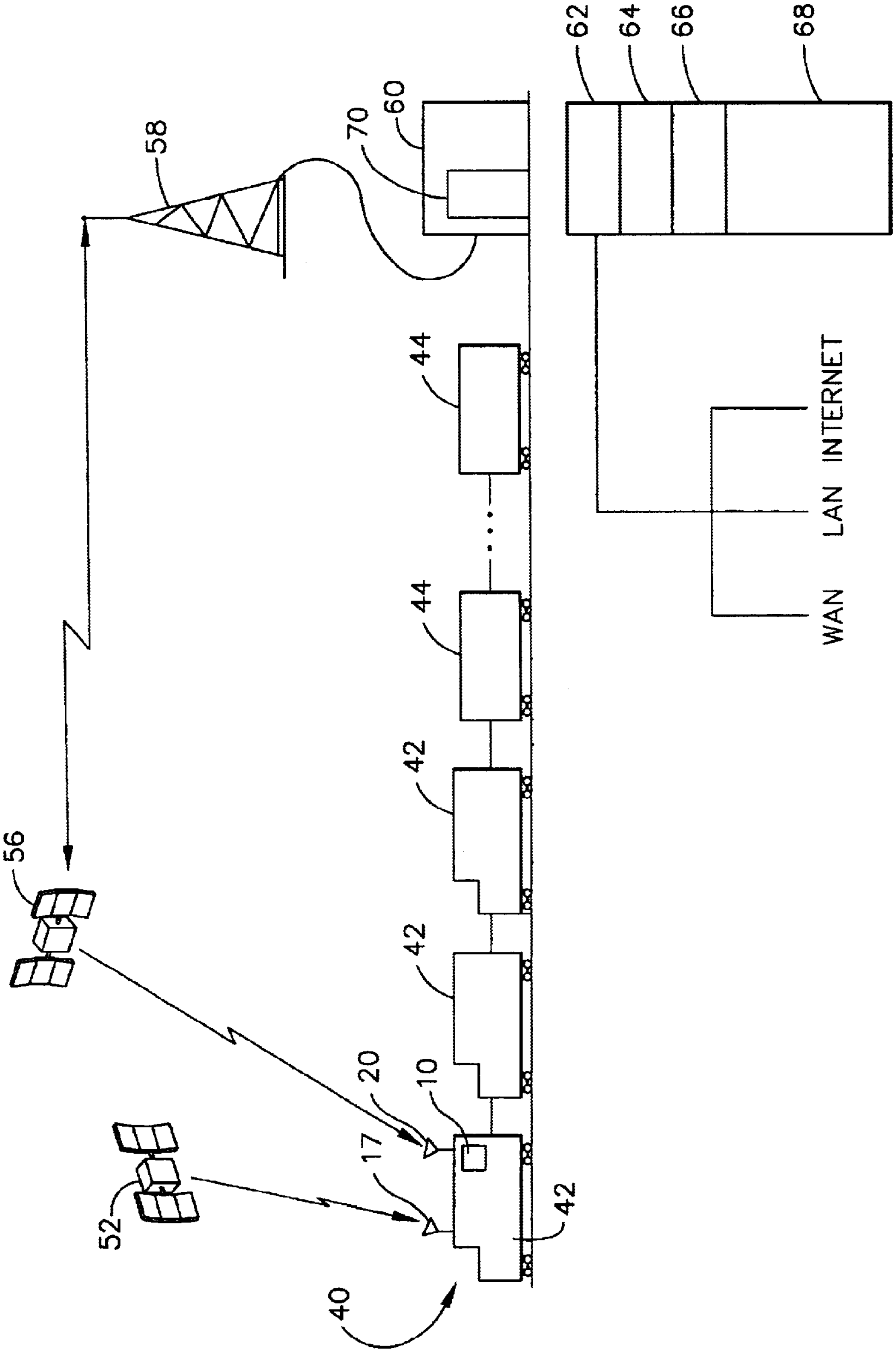
FIG. 2 is block diagram of a train including an on-board pacing system.

FIG. 2 is block diagram of a train 40 including pacing system 10 and at least one locomotive 42. In the exemplary embodiment, train 40 includes a plurality of locomotives 42 and a plurality of railroad cars 44. In the exemplary embodiment, at least one locomotive 42 includes a GPS receiver antenna 17 for receiving GPS positioning data from GPS satellite 52. Locomotive 42 also includes a satellite transceiver antenna 20 for exchanging, transmitting and receiving data messages with a central command center 60. In the exemplary embodiment, central command center 60 includes at least one antenna 58, at least one central computer 62, including a memory 64 and a non-volatile storage medium 66 including at least one database 68 stored therein, and at least one communications transceiver 70 for exchanging data messages with pacing system 10.

GPS receiver 16 determines a position of locomotive 42 and transmits the position data to on-board computer 14. On-board computer 14 also obtains information from specific locomotive sensors and systems that relate to the operational state of the locomotive through vehicle interface 12.

GPS receiver 16 polls at least one GPS satellite 52 at a specified send and sample time. In the exemplary embodiment, three satellites are used for position determination and four satellites are used for vehicle elevation determination. In an alternative embodiment, other numbers of satellites are used to determine position and elevation of the vehicle. In one embodiment, a pre-defined satellite 52 is designated in memory of system 10 to determine absolute position. A data message including the position and data from vehicle interface 12 is then transmitted to central command center 60 via a data satellite 56 utilizing transceiver 54. In one embodiment, data satellite 56 is a different satellite than GPS satellite 52. In an alternative embodiment, satellite 56 and satellite 52 are the same satellite. Data is also transmitted from central command center 60 to each locomotive pacing system 10 via data satellite 56. Central command center 60 includes at least one antenna 58, at least one central computer 62, and at least one communications transceiver 70 for exchanging data messages with pacing systems 10. In an alternative embodiment, communications between central command center 60 and train 40 uses conventional voice radio communications or data over voice multiplexing.

Navigation data provided by GPS alone can be degraded due to operation in tunnels, lack of visibility of satellite constellation, multi-path interference in urban areas and other factors. In one embodiment, a sensor fusion functionality integrates the raw GPS data with locomotive based speed and other data to provide location extrapolation during periods of high position uncertainty. In one embodiment, such functionality is implemented within software of pace system 10. In another embodiment, location extrapolation is an external interface coupled to pace system 10.

In one compensatory embodiment, on-board computer 14 includes a function to recalibrate locomotive position indication by manually updating the position displayed to a known landmark, for example, a bridge or a road crossing. As locomotive 42 crosses a landmark, a function of on-board computer 14 accepts an input from the operator to reposition a train location icon on operator pace display 22 to a correct location. This improved accuracy does not need additional processing nor more expensive receivers or correction schemes. In another compensatory embodiment, auxiliary equipment at the wayside at surveyed locations provides automatic updates. For example, hot axle detector boxes located throughout North America provide VHF radio linked reports to locomotive 42 including a health of bearings of railcars in train 40 as train 40 passes the detector boxes. The reports include an ID of the detector from which precise milepost location may be obtained.

Locomotive 42 transmits a time indexed status message including a position and locomotive operational data on a periodic basis to central command center 60. In another embodiment, each on-board system includes both a communications system 18 and a radio communications transceiver (not shown). The radio communications transceiver is utilized so that each on-board pacing system 10 can exchange data with other on-board pacing systems of train 40 locomotives. For example, rather than each locomotive separately communicating its data with central command center 60 via the data satellite 56, the data can be accumulated by one of the on-board systems 10 via radio communications with the other on-board systems 10. One transmission of all the data to the central station from a particular train consist can then be made from on-board system 10 that accumulates all the data. This arrangement provides the advantage of reducing the number of transmissions. In another embodiment, transmitting data may be piggy backed on an existing on board system, for example a system that performs remote monitoring and diagnostics of a set of locomotive sub-systems, and transmitted by conventional computer networking from a remote monitoring and diagnostics computer server to central command center 60.

Central command center 60 may also include, in yet another embodiment, a web server for enabling access to data at central command center 60 via the Internet. The Internet is an example of a wide area network that could be used, and other wide area networks as well as local area networks could be utilized. In addition, the data may be used to geographically display location of locomotive 42 on a map. Providing such data on a secure site accessible via the Internet enables railroad personnel to access such data at locations remote from central command center 60 and without having to rely on access to specific personnel. The type of data that a railroad may desire to post at a secure site accessible via the Internet includes, by way of example, locomotive identification, locomotive class, size of locomotive, vital statistics, such as, current location or milepost, current speed, acceleration, current power output, and brake setting, pacing system number, idle time, projected time to next meet or pass, current location, remaining fuel on-board, estimated range based on remaining fuel and projected consumption ahead, and time and date transmitted.

Figure 3:
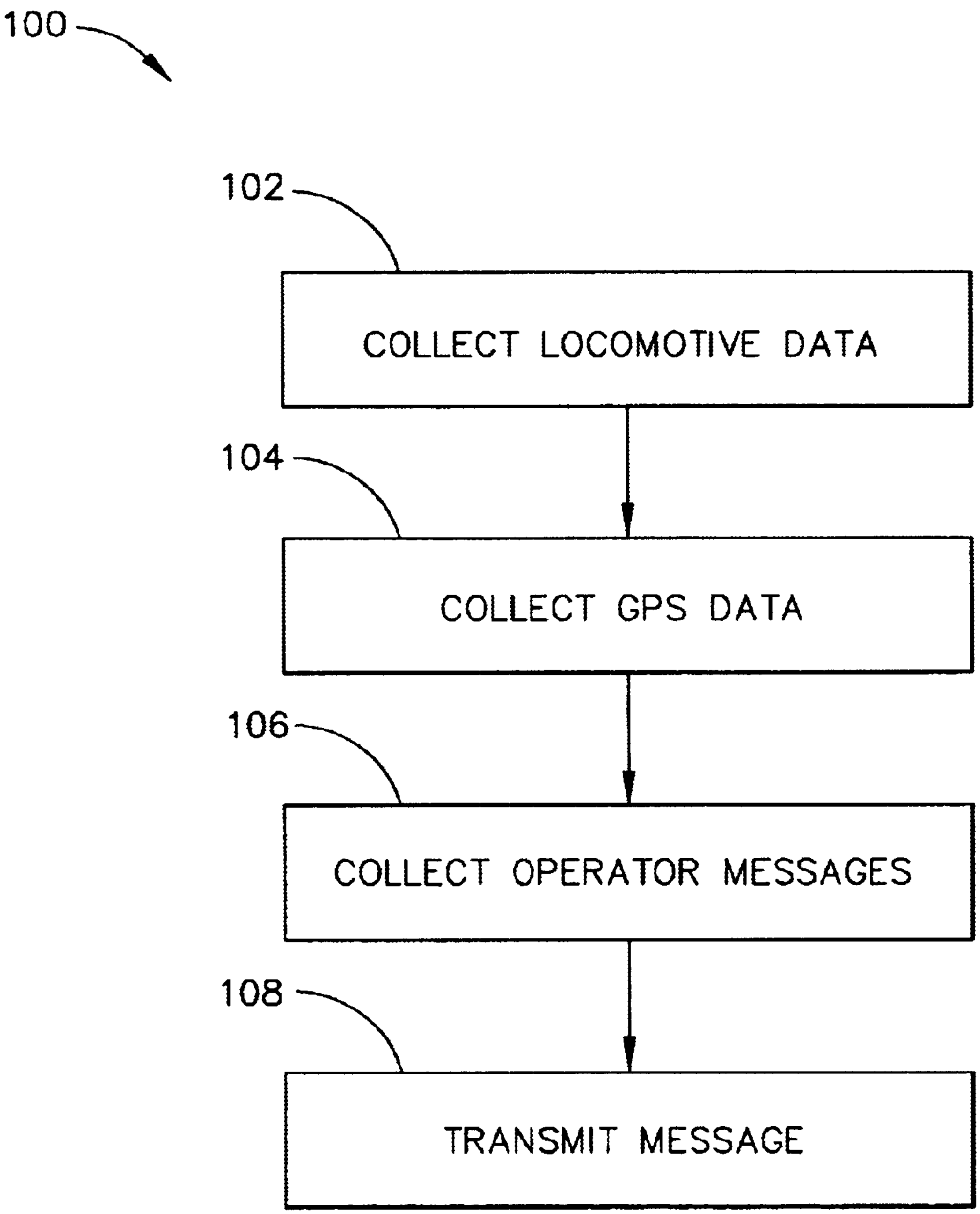
FIG. 3 is a flowchart illustrating an exemplary transmission of a locomotive message to the central command center.

FIG. 3 is a flowchart 100 illustrating an-exemplary transmission of a locomotive message to the central command center 60. The process begins at Block 102. Vehicle interface 12 is electrically coupled to a plurality of sensors 13 located in various systems on locomotive 42. Vehicle interface 12 receives signals from sensors 13, converts the signals to a format readable by on-board computer 14, and transmits signals to on-board computer 14. The signals are representative of operating parameters monitored by each sensor. Sensors are included for at least one of locomotive speed, engine power, track curvature, track grade, heading and heading rate wherein heading represents the direction of travel of the locomotive, reverser handle position, tracklines 8 and 9 online/isolate switch position and fuel onboard.

As shown in block 104, on-board computer 14 receives GPS data from GPS transceiver 16. Transceiver 16 collects position data automatically on a predetermined periodic basis. Transceiver 16 can also be commanded to collect data manually by issuance of a command.

Block 106 shows that operator messages are collected from a buffer in operator pace display 22. In an alternative embodiment, operator messages reside in a file located in on-board computer 14 memory. In yet another embodiment, operator messages reside in a file located on a hard drive of on-board computer 14. Operator messages are messages from locomotive 42 operator to central command center 60. Operator messages are entered manually or by voice commands by the operator. Operator messages are entered by the operator when system anomalies or hazards unmarked by pace system 10 are observed to alert central command center 60 to evaluate pace system 10 databases. In an alternative embodiment, operator messages are generated by on-board computer 14 to log an action taken by the operator. For example, operator pace display 22 indicates a crossing is approaching and the locomotive has entered into a zone wherein a horn on locomotive 42 should be blown. An operator message is generated to record the horn being blown and the message is time-stamped to indicate the precise time the horn was blown. The message is then time-stamped, formatted and transmitted 108 via communications transceiver 18 to central command center 60.

Figure 4:
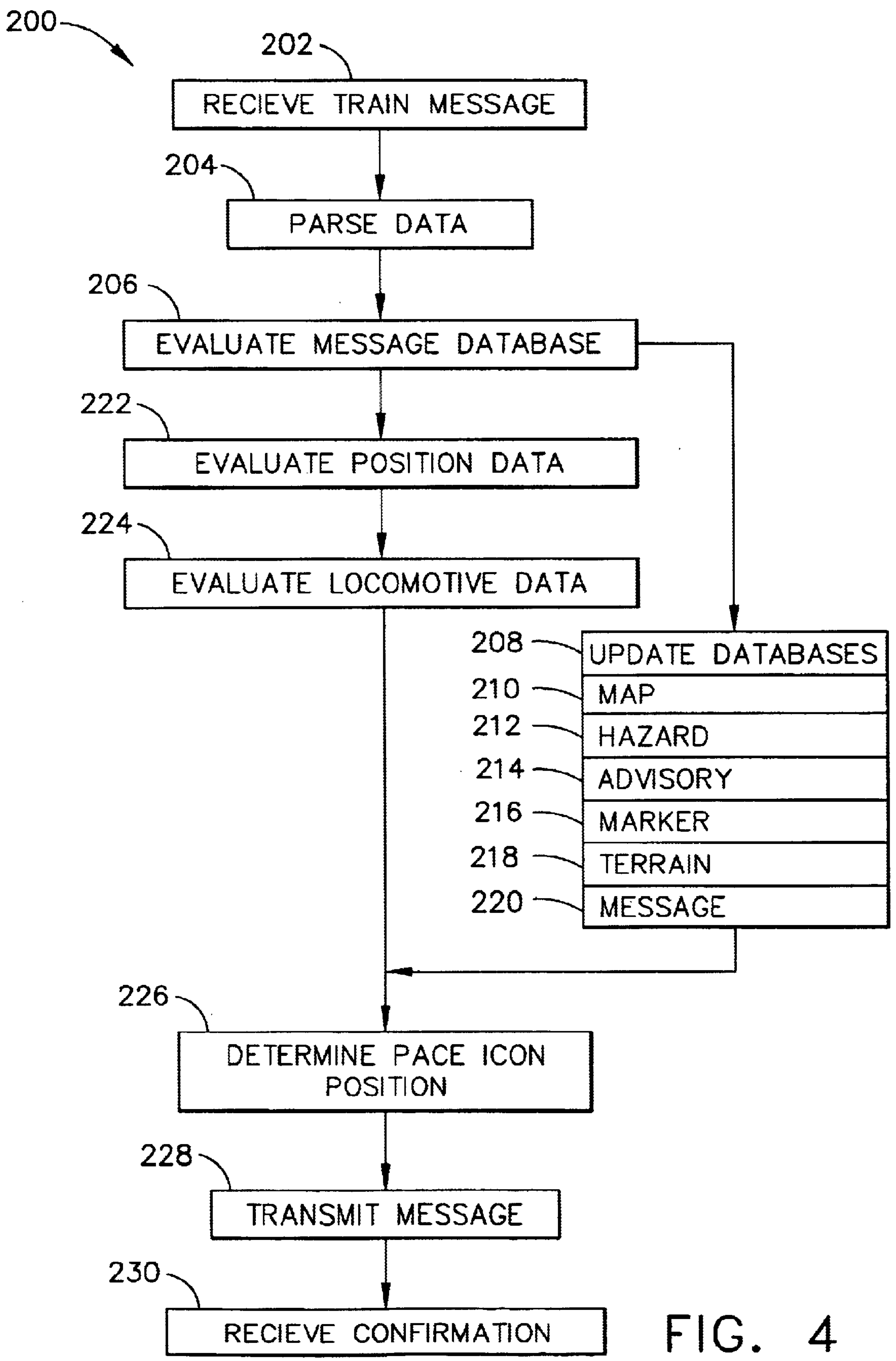
FIG. 4 is a flowchart illustrating an exemplary process of a locomotive message received by a central command center.

FIG. 4 is a flowchart illustrating an exemplary process 200 of a locomotive message received by central command center 60. Block 202 shows the message receipt via a communications transceiver in central command center 60. A central computer 62 in central command center 60 receives the message from the transceiver and parses 204 the data in the messages to data base modules in a program running on central command center central computer 62. In the exemplary embodiment, messages generated by the central command center central computer 62 and on-board computer 14 are formatted similarly. In an alternative embodiment, messages generated by the central command center central computer 62 and on-board computer 14 are formatted such that only data areas expected to change are formatted into the message. For example, a message from on-board computer 14 does not need to format a map database area because changes to the map database will not be initiated by on-board computer 14. On the other hand, a message originating in the central command center central computer 62 will have a map database area because the central command center central computer 62 will be updating the map database in on-board computer 14.

Block 206 of process 200 shows central command center 60 evaluating the train message operator message contents to alert operators at central command center 60 of changing conditions in the area of the current location of train 40.

Central command center 60 can update 208 central command center central computer databases based on the operator message contents. Other databases residing on the central command center central computer 62 include a map database, a hazard database, an advisory database, a marker database, a terrain database and a message database.

Map database 210 includes a coordinate system representing a geographical area, boundary data for the edge of the map in the computer memory, and stationary map features including political boundaries, water stream courses, bodies of water and roads. Hazard database 212 includes coordinate and display information for hazards of a changing, short-term nature, such as inclement weather, ice, snow, fog, rain, lightning. When applied to vehicles such as aircraft, hazard database 212 includes information concerning, for example, turbulence and wind shear. When applied to vehicles such as watercraft, hazard database 212 includes information concerning, for example, wind advisories, wave hazards, and shoals. When applied to vehicles such as spacecraft, hazard database 212 includes information concerning, for example, space debris. Advisory database 214 includes coordinate and display information for advisory issues such as, for example, track construction areas, train close proximity areas, and other areas where out of the ordinary conditions may exist. Marker database 216 includes coordinate and display information for track mile markers, and other landmarks to aid the train operator ascertain train 40 position relative to local landmarks. When applied to vehicles such as aircraft, marker database 216 includes information concerning landmarks that can be seen from the air such as, cities. When applied to vehicles such as watercraft, marker database 216 includes information concerning, buoys, lighthouses, and points of land. Terrain database 218 includes coordinate and display information for features of terrain such as, hills and inclines, valleys and declines, water crossings and blind areas, where a feature affecting the operation of train 40 beyond the visibility of the train operator. Message database 220 includes coordinate and display information for messages directing the train operator to take an action based on conditions, and further identifying features of operator pace display 22. For example, message database 220 includes information explaining an icon on operator pace display 22, for example, indicating construction near the track. Message database 220 also is used to explain new and infrequently used icons such as, for example, a smoke cloud covering the track from fire near the track.

Block 222 shows evaluating train 40 position. Train 40 position is evaluated relative to other trains in the areas to detect potential collision situations, relative to a pace icon position to determine train 40 progress according to a schedule. Results of evaluation 222 are used to determine adjustments to a pace icon on operator pace display 22. Block 224 shows evaluating locomotive data. Locomotive data collected by vehicle interface 12 is evaluated to determine if locomotive 40 is operating according to expected parameters. For example, if a software train model located on central command center central computer 62 indicates a fuel burn rate is excessive, steps can be initiated to investigate the cause. As a further example, if train 40 is trailing the pace icon and train 40 engine throttle is not in an expected position, steps can be initiated to investigate the cause. Block 226 calculates an optimal position for a pace icon to be displayed on operator pace display 22. Central command center central computer 62 performs calculations based on factors including train performance, track commercial needs, forecasted traffic patterns and schedule constraints to calculate a position of the pace icon for train 40 to follow.

Central command center central computer 62 maintains a performance function program code segment in central computer memory 64 that includes algorithms used to determine the pace icon's position on pace display 22. The performance function program code segment models the physical system relating to the vehicle's travel path to determine optimal travel parameters, such as speed, heading, and elevation. The performance function program code segment uses data received from local databases and remote databases accessible via networks, such as the internet, local area networks, and wide area networks to dynamically calculate the vehicle optimal position in real time. The performance function will monitor database changes as they relate to the vehicle's travel path and recalculate a travel path based on a current state of the databases. If the newly calculated travel path is different than a previously calculated travel path, a new optimal position is determined and transmitted to the vehicle. New information regarding an environmental impact, traffic, vehicle maintenance good practices and physical limitations of the vehicle may indicate that a newly calculated travel path is warranted. Central command center central computer 62, additionally includes a knowledge base in memory 64 that includes rules and algorithms which control central command center central computer's learning of patterns in the data included in the databases. In the exemplary embodiment, the knowledge base is in communication with a network including at least one of a wide area network, a local area network, and the Internet. Through these connections, the knowledge base is edited to provide current economic data and operating company policy information. For example, due to track speed limit constraints, it may not be possible for train 40 to achieve the schedule by increasing speed. Central command center 60 is alerted of a schedule fault and a new pace icon position is calculated. Block 228 shows the message being formatted, time-stamped and transmitted to train 40. A receipt confirmation message 230 from train 40 ensures the message was received by train 40.

Figure 5:
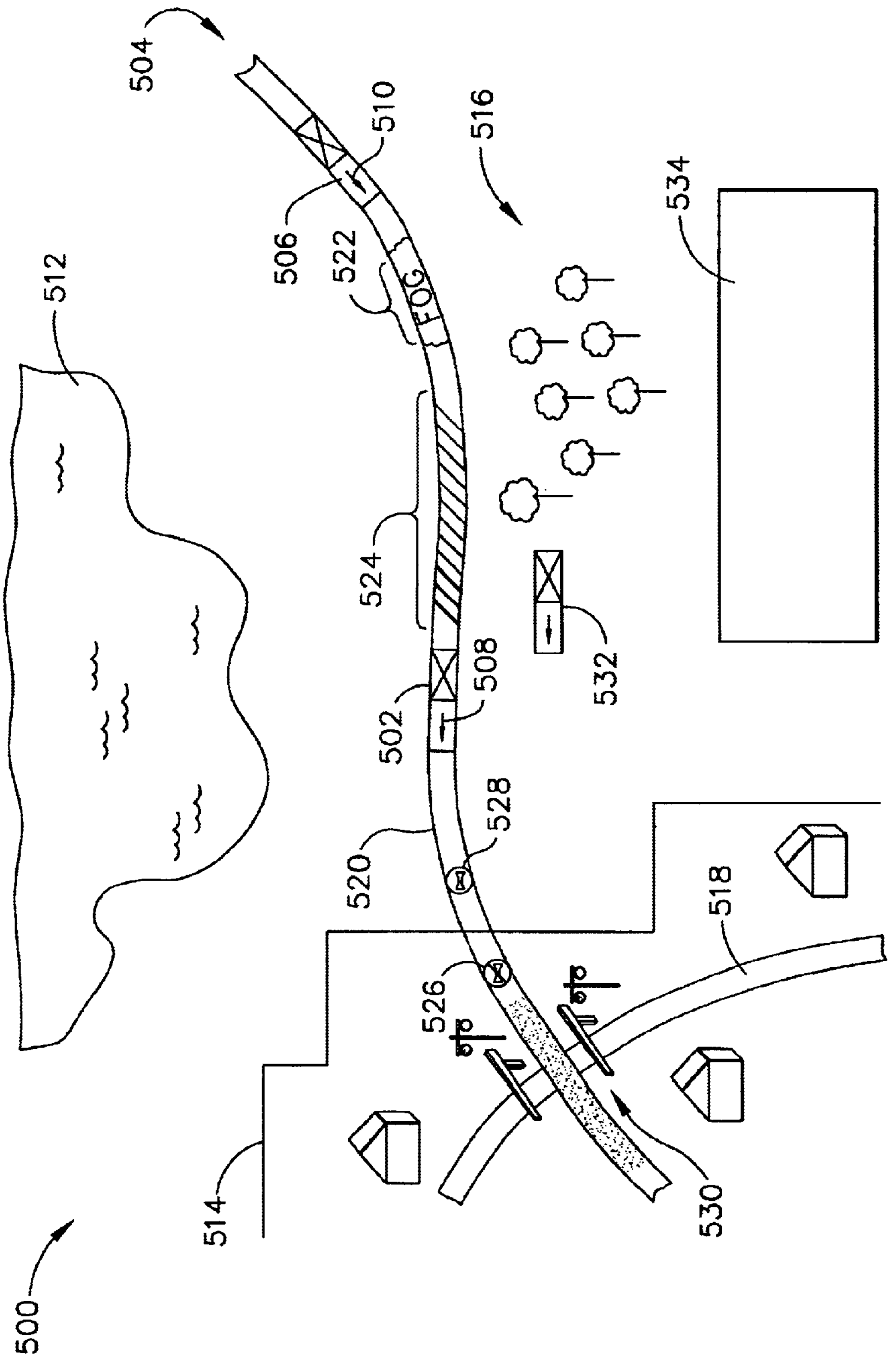
FIG. 5 is a screen shot of an operator view of operator display.

FIG. 5 is a screen shot 500 of an operator view of operator pace display 22 in an exemplary geographical location. Train icon 502 is shown substantially centered in a map area 504 surrounding a current location of train 40. Current train 40 location is determined by on-board GPS transceiver 16, transmitted to on-board computer 14 and used to select a map area 504 corresponding to train 40 current location. GPS location data is also used to fix icon 502 in a position in map area 504 corresponding to train 40 position. As train 40 moves along the track its position changes. After subsequent periodic position fixes by GPS transceiver 16, new position data is transmitted to computer 14. Computer 14 updates operator pace display 22 to show icon 502 still substantially centered in operator pace display 22 but, map area 504 relocated to a new position corresponding to a new position of icon 502. Pace icon is displayed on map area 504 in a position corresponding to an optimal run as determined by central computer 62 at central command center 60. In the exemplary embodiment, train icon 502 is shown leading pace icon 506 as determined by the relative positions of train icon 502 and pace icon 506 and by the direction of heading arrows 508 and 510. With such indication, a train operator can determine train 40 is ahead of schedule and action taken to bring train icon 502 and pace icon 506 into substantial coincidence on operator pace display 22.

Other features of the exemplary operator pace display 22 include a body of water 512, a political boundary 514, a woodland 516, a road 518 and a track 520. Features 512, 514, 516, 518 and 520 are examples of features residing in map database 210. A mirror of a portion of the map database residing in databases 68 at central command center 60 resides on computer 14. In the exemplary embodiment, only a portion of map database resides on computer 14. For example, a particular locomotive of train 40 runs a route between two destinations. The locomotive does not need a complete mirror of map database 210 if it will never travel outside its route area, thus memory resources can be saved on computer 14. As a further example, a train 40 traveling cross-country. In this case, computer 14 memory is incapable of storing the entire portion of map database including its route. Only each portion needed can be transmitted to train 40 when each portion is needed based on the location of train 40.

A fog icon 522 displays to indicate areas of poor visibility, which can affect the operation of train 40. A slack/compression icon 524 indicates a portion of track where train slack may be encountered, for example, an area where train 40 is decelerating or traversing down a decline. An icon 526, for example, indicates an area where horn sounding is not permitted, for example, due to local ordinance. An icon 528, for example, indicates an area where horn sounding is called for, for example, at an upcoming crossing that is obscured by an obstruction. Other icons not cited above indicating other conditions would be overlaid in appropriate positions on pace display 22. For example, icons representing at least space debris, currents, rapids, and falling rocks are contemplated.

A crossing icon 530 indicates an exemplary gated road crossing. For crossing where a gate is not located, a different icon is displayed. The train operator has advance warning of a non-gated crossing and can make appropriate signals for a non-gated crossing. Crossings are areas where a GPS error can be removed from pace display 22 as described above. When train operator observes train icon 502 off the track 520, for example, at a position 532, train operator provides an input to computer 14 through pace display 22 when train 40 is at crossing 530. Computer 14 then updates train icon position 532 relative to track 520 to correct for GPS error. Any marker programmed for correcting GPS error may be used for this purpose.

A message area 534 displays messages to inform the operator of information not displayed with icons and features shown on map area 504. Area 534 is also used to display commands to the operator, such as, for example, to restrict sounding of the horn in a portion of track 520. Area 534 is used to mimic manual text message input to pacing system 10. For example, the operator enters a question, a noted anomalous condition or operational constraint, the message is formatted for transmission to central command center 60 where it is acted upon.

Figure 6:
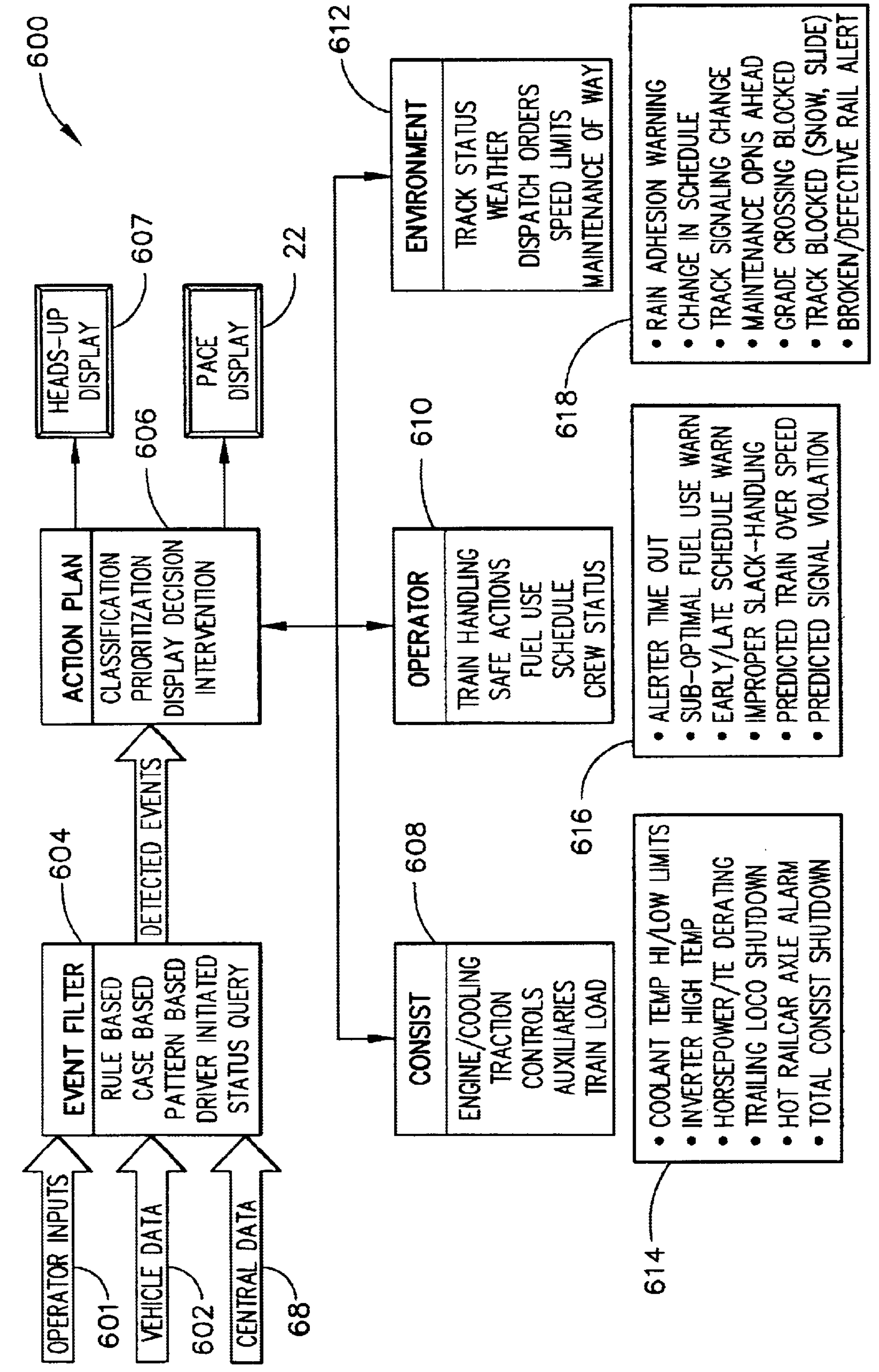
FIG. 6 is a data flow diagram that may be used with the pace system shown in FIG. 1.

FIG. 6 is a data flow diagram 600 that may be used with pace system 10. Operator input data 601, vehicle data 602 from computer 14, and central data base data 68 are received by a situation assessment or event filter 600. Filter 600 includes a plurality of software algorithms that analyze current and past data records in real time to determine information to be displayed to the operator at a present time and a future time. In the exemplary embodiment, for example, the algorithms include production rules, case-based reasoning, statistical pattern matching based on physics-based models and simulations, and historical data.

The algorithms are implemented in computer 14 and central computer 62, and may be implemented on either computer independently, such as when computer 14 and central computer 62 are not in communication with each other. In one embodiment, filter 600 receives a sliding window of sensor data from a current time to a predetermined time period in the past. Such data is processed to detect an event.

An event is a set of data that can be characterized as representing an anomaly that needs to be brought to the operators attention. A software action plan module 606 classifies and prioritizes the event and determines a display and data output that is to be instantiated. Action plan module 606 blocks routine displays during the event to limit distraction to the operator. Displays and data relevant data to the event is presented, and the modality of presentation, such as an alphanumeric message, a graph, an animation of an icon, and a color rendition, is predetermined based on an importance of the event and a response time from the operator, for example, an event notification that is not acknowledged would cause increasingly obnoxious presentations from pace display 22 and/or a heads-up display 607. In certain predetermined events, automatic intervention by pace system 10 is taken. In cases where more than one event occurs in close proximity in time, events prioritized as needing more urgent attention are presented first. In one embodiment, rules in action plan 606 governing a focus of attention and priority are organized as consist or vehicle rules 608, operator rules 610, and environmental rules 612. In another embodiment, the rules are organized differently. Consist rules 608, operator rules 610, and environmental rules 612 may further be sub-divided as shown in subsystem blocks 614, 616, and 618 respectively. For example, consist events may be further partitioned according to major locomotive sub-systems, such as Engine, Cooling, Traction, Controls and Auxiliaries. Representative example foci of attention with priority for display, 607, are given for illustrative purposes in order of priority/urgency for attention by the engineer, but are by no means exhaustive, and include examples of safety, schedule and economic performance goals associated with pacing a given trip.

The above-described vehicle pacing system is cost effective and highly reliable. The vehicle pacing system includes an operator pace display that provides visual indication of a train's progress in relation to an optimal progress and context specific operator messages. The operator pace display is updated periodically with GPS position data from an on-board CPS receiver, from abroad range of on-board sensors, and command data received in messages from a central command center. As a result, the vehicle pacing system facilitates increased quality of coordination of train management than is possible with existing systems based on voice communications and analog locomotive performance display.

Exemplary embodiments of vehicle pacing systems are described above in detail. The systems are not limited to the specific embodiments described herein, but rather, components of the system may be utilized independently and separately from other components described herein. Each vehicle pacing system component can also be used in combination with other vehicle pacing system components.

While the invention has been described in terms of various specific embodiments, those skilled in the art will recognize that the invention can be practiced with. modification within the spirit and scope of the claims.

What is claimed is:

1. A method for pacing a vehicle along a path of travel using a pacing system including at least one tracking system, at least one on-board computer, and at least one operator pace display, said method comprising:

determining a geographical location of the vehicle;

displaying a vehicle position icon representative of the geographical location of the vehicle;

determining an optimal position for the vehicle;

displaying a pace icon representative of the optimal position for the vehicle; and operating the vehicle to maintain a vehicle position icon displayed on the operator pace display substantially coincident with the pace icon displayed on the operator pace display.

2. A method in accordance with claim 1 wherein the at least one tracking system is an on-board tracking system that includes at least one antenna configured to receive satellite Global Positioning System (GPS) signals, and a receiver, said determining the geographical location of the vehicle further comprising:

receiving signals from a GPS satellite;

converting GPS signals to signals representative of vehicle location; and transmitting the vehicle location signals to the on-board computer.

3. A method in accordance with claim 1 wherein the system further includes a central command center including a communications transceiver, said method further comprising transmitting vehicle location signals to the central command center.

4. A method in accordance with claim 3 wherein the system further includes an on-board communications system configured to transmit messages to and receive messages from the central command center, the central command center including at least one central computer including a memory, said method further comprising:

processing a data message from the central command center;

parsing message contents to update at least one of a map database, a hazard database, an advisory database, a marker database, a terrain database and a message database; and locating the vehicle position in a database including at least one of a map database, a hazard database, an advisory database, a marker database, a terrain database, and a message database.

5. A method in accordance with claim 4 further comprising:

receiving the pace icon position representative of the optimal position for the vehicle; and locating the pace icon position in at least one of a map database, a hazard database, an advisory database, a marker database, a terrain database, and a message database.

6. A method in accordance with claim 4 wherein the pacing system includes an event filter, an action plan module, and a system for monitoring operation of the vehicle that includes a vehicle interface, and wherein operating the vehicle further comprises:

receiving at least one of operator inputs, data from the vehicle interface, and data from the central command center; and determining the occurrence of an event from the received data.

7. A method in accordance with claim 6 wherein determining the occurrence of an event further comprises:

using at least one of a rule based algorithm, a case-based algorithm, a pattern-based algorithm, a driver-initiated algorithm, and a status query-based algorithm to determine the event; and classifying and prioritizing the event using at least one of vehicle rules, operator rules and environment rules.

8. A method in accordance with claim 7 wherein classifying and prioritizing the event further comprises:

determining a display modality based on the event classification and priority;

receiving an operator input based on the display modality;

determining a system intervention based on the event classification, priority, received operator input; and displaying operator prompts and queues on at least one of a heads-up display and a pace display based on at least one of the determined display modality, received operator input, and determined system intervention.

9. A method in accordance with claim 1 further comprising:

displaying a map of a geographical area surrounding the vehicle current location;

overlaying icons representing features of interest from at least one of a hazard database, an advisory database, a marker database, a terrain database and a message database; and displaying the vehicle position icon representing the location of the vehicle in relation to the position of the map of the geographical area and the icons representing features of interest;

displaying the pace icon representing the optimal position of the vehicle in relation to the position of the map of the geographical area and the icons representing features of interest.

10. A method in accordance with claim 1 further comprising:

evaluating the vehicle location in relation to features of interest in databases including at least one of a map database, a hazard database, an advisory database, a marker database, a terrain database and a message database;

evaluating vehicle operation relative to a performance function;

determining an optimal vehicle location; and transmitting a pace icon position corresponding to the optimal vehicle location to the on-board computer.

11. A method in accordance with claim 10 wherein determining an optimal vehicle location further comprises:

searching a plurality of databases;

retrieving information from a plurality of databases pertaining to the vehicle, the path of travel and a plurality of alternate paths of travel;

evaluating the vehicle past performance;

evaluating features of the alternate paths of travel;

using the performance function to determine an optimal path of travel and speed of travel.

12. A method in accordance with claim 11 wherein determining an optimal pace icon position further comprises converting the determined path of travel and speed of travel to real-time vehicle position.

13. A method in accordance with claim 1 wherein the pacing system includes a system for monitoring the operation of the vehicle that includes a vehicle interface, and electrical signals representing at least one of vehicle velocity, engine power, run-in slack, track curvature, track incline, vehicle heading and heading rate, wherein heading represents the direction of travel, said operating the vehicle comprising:

receiving the electrical signals using the vehicle interface;

determining a relative difference between the position of the vehicle icon and the position of the pace icon; and adjusting vehicle speed and vehicle heading wherein heading represents the direction of travel, to bring the vehicle icon and the pace icon into substantial coincidence.

14. A vehicle pacing system for pacing a vehicle along a path of travel comprising:

at least one tracking system configured to determine a geographical location of said vehicle;

at least one on-board computer, including a memory and a non-volatile storage medium, in communication with said at least one tracking system, said on-board computer configured to determine a display position of a pace icon; and at least one operator pace display in communication with said at least one on-board computer, said pace display configured to display said pace icon at a position determined by at least one of said on-board computer and a central computer, said operator pace display further configured to display said vehicle position icon, as determined by at least one of said on-board computer and said central computer, relative to said pace icon.

15. A vehicle pacing system in accordance with claim 14 wherein said tracking system comprises an on-board global positioning system (GPS) transceiver including a GPS antenna.

16. A vehicle pacing system in accordance with claim 14 further comprising:

a monitoring system for monitoring vehicle operation including sensors configured to determine at least one of vehicle speed, engine power, vehicle slack, track curvature, track incline vehicle heading and heading rate wherein heading represents the direction of travel of the vehicle, reverser handle position, tracklines 8 and 9, online/isolate switch position, fuel remaining; and a vehicle interface coupled to said sensors and in communication with said on-board computer.

17. A vehicle pacing system in accordance with claim 14 further comprising:

an on-board communications system located on-board said vehicle configured to send and receive formatted messages;

a central computer located remotely from said vehicle, said central computer in communication with said on-board communications system.

18. A vehicle pacing system in accordance with claim 17 wherein said central computer is configured to determine a pace icon display location on said operator pace display.

19. A vehicle pacing system in accordance with claim 17 wherein said central computer comprises:

at least one database including at least one of a database including map-related data for said path of travel, a database including weather-related hazard data for said path of travel, a database including vehicle-advisory related data for said path of travel, a database including marker related data for said path of travel, a database including terrain data for said path of travel, and a database including message data for operating said vehicle; and a performance function program code segment that determines a display position of the pace icon based on at least one of said databases.

20. A vehicle pacing system in accordance with claim 19 wherein said onboard computer comprises a mirror of a portion of said central command center central computer databases.

21. A vehicle pacing system in accordance with claim 17 wherein said central computer includes a memory including a program code segment configured to optimize a performance function to determine a pace icon display location on said operator display.

22. A vehicle pacing system in accordance with claim 17 wherein said central computer is configured to update said on-board computer memory.

23. A vehicle pacing system in accordance with claim 17 that further comprises:

a system for monitoring operation of said vehicle that includes a vehicle interface;

an event filter configured to receive at least one of operator inputs, data from said vehicle interface, and data from said central command center, event filter configured to determine the occurrence of an event from the received data; and an action plan module configured to classify and prioritize said event using at least one of vehicle rules, operator rules and environment rules.

24. A vehicle pacing system in accordance with claim 23 wherein said event filter further comprises:

at least one of a rule based algorithm, a case-based algorithm, a pattern-based algorithm, a driver-initiated algorithm, and a status query-based algorithm.

25. A vehicle pacing system in accordance with claim 23 wherein action plan module is further configured to:

determine a display modality based on at least one of said event classification, and said event priority;

receive an operator input based on said display modality;

determine a system intervention based on at least one of said event classification, said event priority, and said received operator input;

and display operator prompts and queues on at least one of a heads-up display and a pace display based on at least one of said determined display modality, said received operator input, and said determined system intervention.

26. A vehicle pacing system in accordance with claim 14 wherein said on-board pace display is further configured to display operator messages.

27. A vehicle pacing system in accordance with claim 14 wherein said on-board pace display is further configured to display at least one of:

a map layer comprising map features configured from a map database;

a hazard layer comprising hazard icons configured from a hazard database;

an advisory layer comprising advisory icons configured from an advisory database;

a marker layer comprising marker icons configured from a marker database;

a terrain layer comprising exaggerated terrain features configured from a terrain database; and a message layer comprising message data configured from a message database.

28. A vehicle pacing system in accordance with claim 14 wherein said on-board computer is configured to operate independently.

29. A locomotive pacing system for pacing a locomotive along a path of travel comprising:

at least one tracking system configured to determine a geographical location of said locomotive;

at least one on-board computer, including a memory and a non-volatile storage medium, in communication with said at least one tracking system, said on-board computer configured to determine a display position of a pace icon;

at least one operator pace display in communication with said at least one on-board computer, said operator pace display configured to display said pace icon at a position determined by at least one of said on-board computer and a central computer, said operator pace display further configured to display said locomotive position, as determined by at least one of said on-board computer and a central computer, relative to said pace icon;

a system for monitoring locomotive operation including sensors configured to determine at least one of locomotive speed, engine power, train slack, track curvature, track incline locomotive heading and heading rate wherein heading represents the direction of travel of the locomotive, reverser handle position, throttle position, online/isolate switch position, fuel remaining; and an interface coupled to said sensors and in communication with said on-board computer.

* * * * *